US012596191B2

(12) United States Patent
Lieb et al.

(10) Patent No.:    US 12,596,191 B2
(45) Date of Patent:         Apr. 7, 2026

(54) SYNTHETIC APERTURE RADAR USING ALTERNATING BEAMS AND ASSOCIATED METHODS

(71) Applicant: EAGLE TECHNOLOGY, LLC, Melbourne, FL (US)

(72) Inventors: Donald A. Lieb, Melbourne, FL (US); Robert Riley, Melbourne, FL (US); Robert M. Taylor, Rockledge, FL (US); Kerry T. Speed, Melbourne, FL (US); Timothy E. Durham, Melbourne, FL (US)

(73) Assignee: EAGLE TECHNOLOGY, LLC, Melbourne, FL (US)

( * ) Notice:    Subject to any disclaimer, the term of this patent is extended or adjusted under 35 U.S.C. 154(b) by 300 days.

(21) Appl. No.: 18/179,721

(22) Filed:    Mar. 7, 2023

(65)             Prior Publication Data

US 2024/0302524 A1        Sep. 12, 2024

(51) Int. Cl.
*G01S 13/90*          (2006.01)
*G01S 13/02*          (2006.01)
(52) U.S. Cl.
CPC ...... *G01S 13/9056* (2019.05); *G01S 13/9054* (2019.05); *G01S 2013/0245* (2013.01)
(58) Field of Classification Search
CPC ............. G01S 13/9056; G01S 13/9054; G01S 2013/0245; G01S 13/225; G01S 13/904
See application file for complete search history.

(56)             References Cited

U.S. PATENT DOCUMENTS

| | | | |
|---|---|---|---|
| 5,394,151 A | 2/1995 | Knaell et al. | |
| 5,627,543 A | 5/1997 | Moreira | |
| 5,677,693 A | 10/1997 | Frankot et al. | |
| 6,100,839 A | 8/2000 | Heger et al. | |

(Continued)

FOREIGN PATENT DOCUMENTS

| | | |
|---|---|---|
| DE | 102012219229 | 4/2014 |
| DE | 102021206555 | 12/2022 |

OTHER PUBLICATIONS

Queiroz et al., "On a Dual-Sequence Stripmap Imaging Mode as Alternative for High-Resolution Wide-Swath SAR," EUSAR 2022; 14th European Conference on Synthetic Aperture Radar, Leipzig, Germany, 2022, pp. 1-6 (Year: 2022).*

(Continued)

*Primary Examiner* — Robert W Hodge
*Assistant Examiner* — Bongani Jabulani Mashele
(74) *Attorney, Agent, or Firm* — ALLEN, DYER, DOPPELT, GILCHRIST, P.A.

(57)             ABSTRACT

A synthetic aperture radar (SAR) for a flight vehicle may include an elongate phased array antenna oriented with a long axis in an elevation direction. The elevation direction is normal to a direction of flight of the flight vehicle. A transmitter is coupled to the elongate phased array antenna, and a receiver is coupled to the elongate phased array antenna. A controller is coupled to the transmitter and receiver and is configured to generate temporally alternating sets of receive beams for respective swaths to be used to form a SAR image across a surface below the flight vehicle. The same center frequency is used to create consistent SARs for all swaths, allowing for coherent combination between subsequent passes over the same swath.

21 Claims, 5 Drawing Sheets

(56) References Cited

U.S. PATENT DOCUMENTS

| | | | |
|---|---|---|---|
| 6,781,540 B1 | 8/2004 | MacKey et al. | |
| 6,965,341 B1 | 11/2005 | Cho et al. | |
| 7,053,813 B1 | 5/2006 | Hubbert et al. | |
| 8,193,974 B2 | 6/2012 | Logan et al. | |
| 9,134,415 B2 | 9/2015 | Li et al. | |
| 9,329,073 B2 | 5/2016 | Sai | |
| 9,329,074 B2 | 5/2016 | Sai | |
| 9,869,763 B2 | 1/2018 | Calabrese | |
| 9,869,764 B2 | 1/2018 | Calabrese | |
| 10,163,178 B1 * | 12/2018 | Sprogis | H04W 4/023 |
| 10,615,513 B2 | 4/2020 | Fox et al. | |
| 10,871,561 B2 | 12/2020 | Fox | |
| 10,955,546 B2 | 3/2021 | Fox | |
| 11,183,768 B1 | 11/2021 | Taylor et al. | |
| 11,262,446 B2 | 3/2022 | Speed et al. | |
| 2020/0103520 A1 * | 4/2020 | Fox | G01S 13/90 |
| 2020/0348412 A1 * | 11/2020 | Durham | H01Q 21/28 |

OTHER PUBLICATIONS

A. Freeman et al., "SweepSAR: Beam-forming on receive using a reflector-phased array feed combination for spaceborne SAR," 2009 IEEE Radar Conference, Pasadena, CA, USA, 2009, pp. 1-9 (Year: 2009).*

Freeman et al. "SweepSAR: Beam-forming on Receive using a Reflector-Phased Array Feed Combination for Spaceborne SAR" IEEE National Radar Conference—Proceedings: Jun. 2009; pp. 10.

Krieger et al. "Advanced Concepts for High-Resolution Wide-Swath SAR Imaging" 8th European Conference on Sythetic Aperture Radar; Jun. 7-10, 2010. https://core.ac.uk/download/pdf/11142255.pdf. pp. 4.

Almeida et al., "On a dual pri pulse sequence mode for high-resolution wide-swath SAR imaging", German Aerospace Center, Microwaves and Radar Institute, IEEE, 2021, pp. 2967-2970.

* cited by examiner

SYNTHETIC APERTURE RADAR USING ALTERNATING BEAMS AND ASSOCIATED METHODS

TECHNICAL FIELD

The present disclosure relates to radars and, more particularly, to a synthetic aperture radar (SAR).

BACKGROUND

A synthetic aperture radar (SAR) is highly effective for remote sensing using active microwave transmissions at a variety of wavelengths between L-band and Ku-band, but achieving a large range swath may be difficult. In a conventional single feed scan mode radar system, the length of the continuous range swath that can be received may be limited by the radar reception time window between consecutive transmitted pulses, for example.

The maximum time between transmit pulses required to avoid Doppler ambiguities within the antenna beam width is one half the antenna width divided by the platform velocity. This inherent limit on range swath may be a significant issue for smaller antennas, especially when the antenna is not tall enough to form a narrow enough beam to suppress radar returns from ambiguous ranges.

SUMMARY

A synthetic aperture radar (SAR) for a flight vehicle may comprise an elongate phased array antenna oriented with a long axis in an elevation direction. The elevation direction is normal to a direction of flight of the flight vehicle. A transmitter and a receiver may be coupled to the elongate phased array antenna. A controller may be configured to cooperate with the transmitter and receiver to generate temporally alternating sets of receive beams for respective swaths to be used to form a SAR image across a surface below the flight vehicle.

The respective swaths may comprise first and second swaths, and wherein the alternating sets of receive beams may comprise a first set of receive beams and a second set of receive beams. The first set of receive beams is for the first swath and may comprise a plurality of first subswaths, with adjacent first subswaths being separated by a respective first gap. The second set of receive beams is for the second swath and may comprise a plurality of second subswaths, with adjacent second subswaths being separated by a respective second gap.

The plurality of second subswaths may overlap with the respective first gaps in the plurality of first subswaths.

The controller may be configured to operate the receiver to receive the first set of receive beams before receiving the second set of receive beams.

The controller may be configured to operate the transmitter to generate pulses at a first pulse repetition frequency (PRF) to be received by the first set of receive beams, and generate pulses at a second PRF to be received by the second set of receive beams. The second PRF may be higher than the first PRF to shift the respective second gaps in the second set of receive beams to overlap the plurality of first subswaths in the first set of receive beams.

The controller may be configured to operate the transmitter to transmit during the respective first and second gaps in the first and second sets of receive beams.

The elongate phased array antenna may comprise M adjustable elements positioned along the long axis, the receiver may comprises N channel inputs, the first and second set of receive beams may each comprise N beams, and the plurality of first and second subswaths may each comprise N subswaths. The SAR may further comprise a beam forming network (BEN) comprising M inputs coupled to the M adjustable elements in the elongate phased array antenna and N outputs coupled to the N channel inputs in the receiver. The controller may be configured to adjust the M adjustable elements for forming the N receive beams in the first and second swaths, with each channel input in the receiver corresponding to a respective subswath in the first set of receive beams and to a respective subswath in the second set of receive beams.

The SAR may further comprise a distribution network comprising M outputs coupled to the M adjustable elements in the elongate phased array antenna and an input coupled to an output of the transmitter. The distribution network may be configured to spread out the single beam by adjusting the M adjustable elements.

The transmitter may be configured to operate at a fixed center frequency.

The elongate phased array antenna has a short axis oriented in an azimuth direction, and may be configured to transmit a single beam across the respective swaths in the same azimuth direction.

The elongate phased array antenna may comprise a reflector oriented with a long axis in the elevation direction, and a plurality of elements forming a one-dimensional array positioned along the long axis adjacent the reflector.

The controller may be configured to transmit data to a remote image processor to form the SAR image across the surface below the flight vehicle.

Another aspect is directed to a method for operating a synthetic aperture radar (SAR) for a flight vehicle. The SAR may comprise an elongate phased array antenna oriented with a long axis in an elevation direction. The elevation direction is normal to a direction of flight of the flight vehicle. A transmitter may be coupled to the elongate phased array antenna, and a receiver may be coupled to the elongate phased array antenna. The method may comprise operating a controller coupled to the transmitter and receiver to generate temporally alternating sets of receive beams for respective swaths to be used to form a SAR image across a surface below the flight vehicle.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

Figure 1:
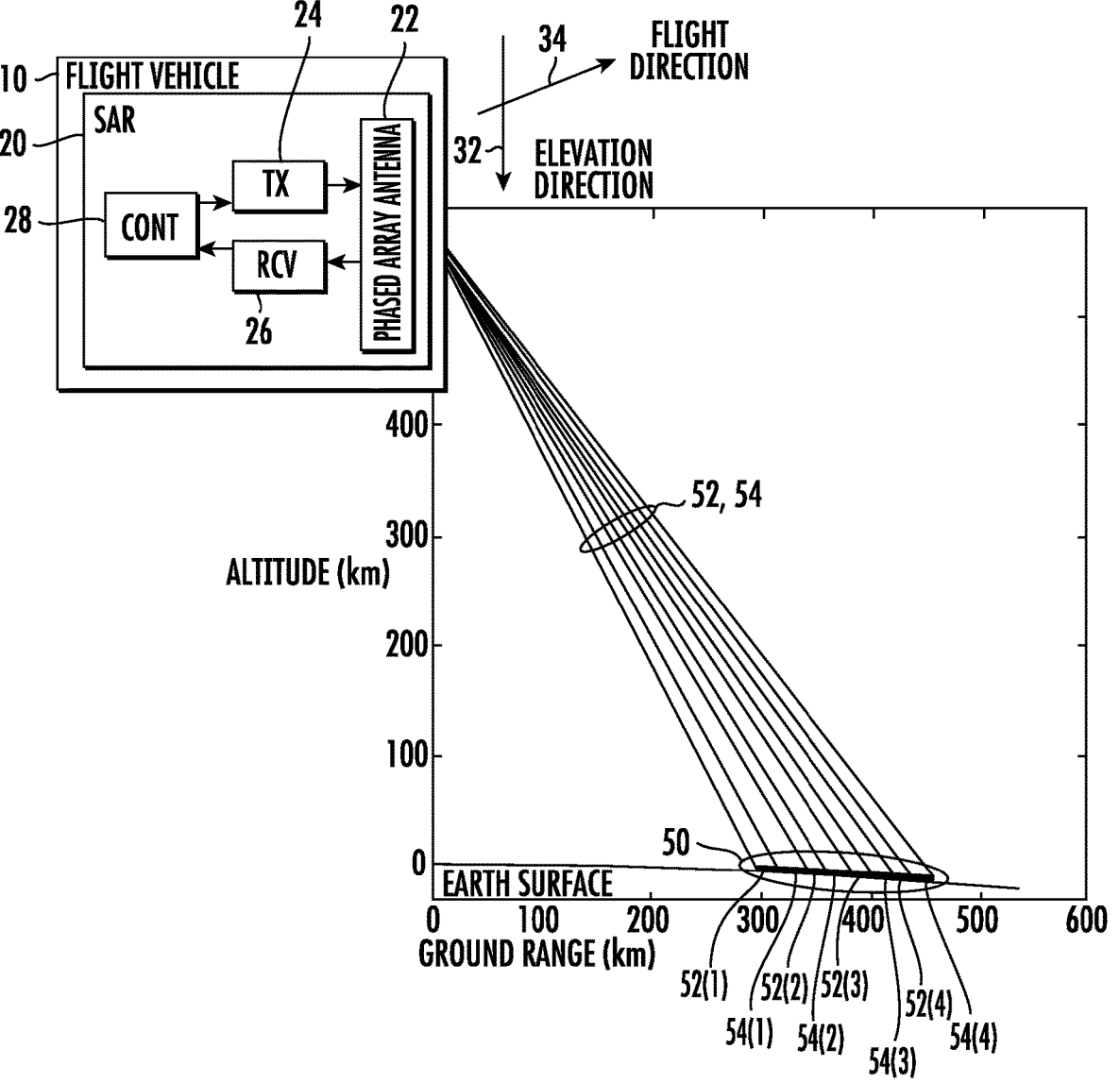
FIG. 1 is a schematic block diagram of a flight vehicle with a synthetic aperture radar (SAR) generating temporally alternating sets of receive beams in which various aspects of the disclosure may be implemented.

Referring initially to FIG. 1, a synthetic aperture radar (SAR) 20 for a flight vehicle 10 will be discussed. The flight vehicle 10 may be a satellite, an airplane, an aerostat, or a drone, for example. The synthetic aperture radar 20 will also be referred to as a wide-swath interleaved phased array radar (WIPAR).

A swath refers to a strip of surface area below the flight vehicle 10 from which data is collected by the SAR 20. When the flight vehicle 10 is above the Earth, for example, the swath is on the Earth's surface. A wider swath advantageously allows the flight vehicle 10 to cover a bigger area in the same period of time. This correlates to more data being collected and analyzed in a single pass.

A basic synthetic aperture radar measures a single swath across the ground as the flight vehicle moves. A velocity of the flight vehicle determines the minimum pulse repetition frequency (PRF) that is needed to avoid Doppler ambiguity. The higher the PRF means more pulses are being transmitted, wherein the distance on the ground between pulses limits a width of the swath.

As will be discussed below, interleaved temporal operation of the synthetic aperture radar 20 allows multiple swaths to be measured without Doppler ambiguity. The processed data of the multiple swaths provides a wider swath by reassembling or stitching together the multiple swaths into a continuous image.

The synthetic aperture radar 20 includes an elongate phased array antenna 22 oriented with a long axis in an elevation direction 30. The elevation direction 30 is normal to a direction of flight 32 of the flight vehicle 10. Since a height of the phased array antenna 22 is tall in the elevation direction 30, this allows more narrow elevation receive beams to be formed.

A short axis of the phased array antenna 22 is oriented in an azimuth direction, which corresponds to the direction of flight 32 of the flight vehicle 10. Since a width of the phased array antenna 22 is narrow, this allows wider beams in azimuth to cover the entire width of the multiple swaths. The wider beams may also improve SAR cross range resolution by allowing the ground to stay illuminated longer in scan mode operation, thus increasing the collected SAR azimuth angle.

A transmitter 24 and a receiver 26 are coupled to the elongate phased array antenna 22. A controller 28 is coupled to the transmitter 24 and receiver 26, and is configured to generate the temporally alternating sets of receive beams 52, 54 for respective swaths to be used to form a SAR image across a surface 50 below the flight vehicle 10.

The respective swaths include first and second swaths used to form the SAR image across the surface 50. The sets of receive beams 52, 54 include a first set of receive beams 52 for the first swath, and a second set of receive beams 54 for the second swath. For illustration purposes, a number of receive beams 52 in the first set equals 4 and a number of receive beams 54 in the second set equals 4. In total, there are 8 receive beams. This number of receive beams is not to be limiting. The total number of receive beams will vary based on the size of the elongate phased array antenna 22.

The first set of receive beams 52 for the first swath include a plurality of first subswaths 52(1), 52(2), 52(3), 52(4). Each first subswath corresponds to a respective beam in the first set of receive beams 52. Adjacent first subswaths 52(1), 52(2), 52(3), 52(4) are separated by a respective gap. The gaps occur during the periods when the receiver is turned off while pulses are transmitted. Individual receive beams aimed at each subswath 52(1), 52(2), 52(3), 52(4) differentiates them from one another.

Similarly, the second set of receive beams 54 for the second swath include a plurality of second subswaths 54(1), 54(2), 54(3), 54(4). Each second subswath corresponds to a respective beam in the second set of receive beams 54. Adjacent second subswaths 54(1), 54(2), 54(3), 54(4) are separated by a respective gap. Individual receive beams aimed at each subswath 54(1), 54(2), 54(3), 54(4) differentiates them from one another.

As shown in surface 50 below the flight vehicle 10, the plurality of second subswaths 54(1), 54(2), 54(3), 54(4) overlap with the respective gaps in the plurality of first subswaths 52(1), 52(2), 52(3), 52(4) to provide continuous coverage. The receiver 26 is configured to simultaneously receive all of the beams in the first set of receive beams 52 for the duration of the set of pulses at the first PRF before alternating to simultaneously receive all of the beams in the second set of receive beams 54 for the duration of the set of pulses at the second PRF.

Another way of explaining the alternating sets of receive beams 52, 54 with the gaps is by referring to the first subswaths as odd subswaths and the second subswaths as even subswaths. Using the above example, there are 8 total first and second subswaths that are used to form the SAR image across a surface 50 below the flight vehicle 10. The plurality of first subswaths 52(1), 52(2), 52(3), 52(4) correspond to odd subswath positons 1, 3, 5 and 7, whereas the plurality of second subswaths 54(1), 54(2), 54(3), 54(4) correspond to even subswath positons 2, 4, 6 and 8.

The gaps between the adjacent odd first subswaths 1, 3, 5 and 7 are blind spots in the first swath since the transmitter 24 is transmitting pulses in these gaps to be received by the even second subswaths 2, 4, 6 and 8. Likewise, the gaps between the adjacent even second subswaths 2, 4, 6 and 8 are blind spots in the second swath since the transmitter 24 is now transmitting pulses in these gaps to be received by the next alternating odd first subswaths 1, 3, 5 and 7.

A pulse repetition frequency (PRF) of the pulses received by the even second subswaths 2, 4, 6 and 8 is slightly higher than the PRF of the pulses received by the odd first subswaths 1, 3, 5 and 7. The higher PRF causes the second subswaths 2, 4, 6 and 8 to be shifted over so that they overlap with the gaps in the odd first subswaths 1, 3, 5 and 7.

Figure 2:
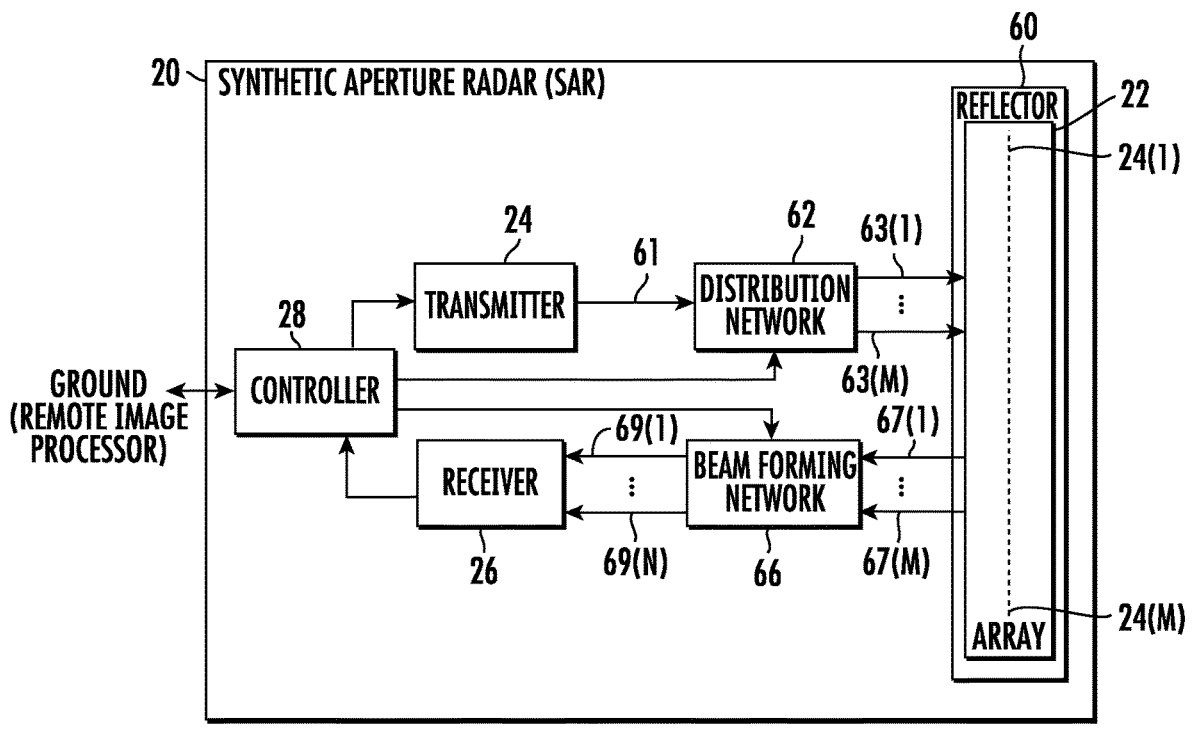
FIG. 2 is a detailed schematic block diagram of the synthetic aperture radar illustrated in FIG. 1.

Referring now to FIG. 2, the synthetic aperture radar 20 will be discussed in greater detail. An example size of the elongate phased array antenna 22 is 2 meters in width by 17 meters in height, with its long axis corresponding to the height. The actual size of the elongate phased array antenna 22 will vary depending on the intended application, as well as the type of flight vehicle 10 being used.

The elongate phased array antenna 22 comprises M adjustable elements 24(1)-24(M) positioned along the length of the long axis. The M adjustable elements 24(1)-24(M) may be generally referred to as adjustable elements 24.

The number of M adjustable elements 24 may be several hundred to several thousand, for example. Each of the adjustable elements 24(1)-24(M) is switchable between a transmit mode and a receive mode. A respective phase shifter or time delay unit (TDU) associated with each element 24 may be adjusted based on a desired shape of the transmit beam and the number of desired receive beams.

The elongate phased array antenna 22 further includes a reflector 60 oriented with a long axis in the elevation direction 30. The adjustable elements 24(1)-24(M) are positioned to form a one-dimensional (1D) array along the long axis. The adjustable elements 24(1)-24(M) are positioned to transfer RF energy with the reflector 60 during transmit and receive modes.

The reflector 60 avoids the need for a two-dimensional (2D) array, which would increase the weight and complexity of the synthetic aperture radar 20. In addition, there is a cost saving with the one-dimensional (1D) array.

The reflector 60 may be configured as a dual boom deployable parabolic trough reflector, as disclosed in U.S. Pat. No. 11,183,768. This patent is assigned to the current assignee of the present application, and its entirety is incorporated herein by reference. The deployable parabolic trough reflector may be configured to include two telescoping booms that are coupled to a support structure. Each boom includes feed panels located at certain positions relative to the parabolic trough shaped surface.

The adjustable elements 24(1)-24(M) are carried by the feed panels and are positioned to face a concave surface of the parabolic trough shaped surface. The adjustable elements 24(1)-24(M) are switchable between illuminating the concave surface of the reflector with RF energy, or being illuminated by the reflector 60 that has gathered RF energy from the surface 50 below the flight vehicle 10.

Positioned between the transmitter 24 and the elongate phased array antenna 22 is a distribution network 62. The distribution network 62 has M outputs 63(1)-63(M) coupled to the M adjustable elements 24(1)-24(M), and a single input 61 coupled to the transmitter 24. Even though the transmitter 24 and distribution network 62 are shown as separate devices, they may be packaged as a single device.

The transmitter 24 includes a waveform generator configured to generate pulses to be received by the distribution network 62. The pulses are generated at a fixed center frequency f1. In U.S. Pat. No. 11,262,446 assigned to the current assignee of the present application, the pulses are generated in non-overlapping frequency channels centered at frequencies f1-f4, respectively.

The distribution network 62 is configured to adjust the respective phase shifter or time delay unit (TDU) associated with each element 24 to form a single transmit beam spread out over a wide area. The adjustable elements 24(1)-24(M) are adjusted by the distribution network 62 so that the transmit beam illuminates the entire surface 50 below the flight vehicle 10.

Positioned between the receiver 26 and the elongate phased array antenna 22 is a beam forming network (BFN) 66. The beam forming network has M inputs 67(1)-67(M) coupled to the M adjustable elements 24(1)-24(M), and N outputs 69(1)-69(N) coupled N channel inputs in the receiver 26. As an alternative to a single receiver having N channel inputs, N different receivers may be used.

As noted above, the receiver 26 is configured to receive the first set of receive beams 52 before receiving the second set of receive beams 54. The number of receive beams 52 in the first set equals N, and the number of receive beams 54 in the second set equals N. The N channel inputs in the receiver 26 alternate between receiving the N first receive beams 52, and then receiving the N second receive beams 54. Each channel input receives a respective receive beam 52 in the first set, and a corresponding respective receive beam 54 in the second set. The number of channels inputs will double if dual polarization is used. The polarization may include horizontal and vertical polarization, or left hand/right hand circularization.

The receiver 26 outputs the received image data provided by the first and second set of receive beams 52, 54 to the controller 28. The controller 28 may be configured to transmit the received image data to a ground processing system that will form the SAR image across the surface 50 below the flight vehicle 10. Alternatively, the controller 28 may include graphical processing units (GPUs) to process the received image data and form the SAR image across the surface 50 below the flight vehicle 10.

Figure 3:
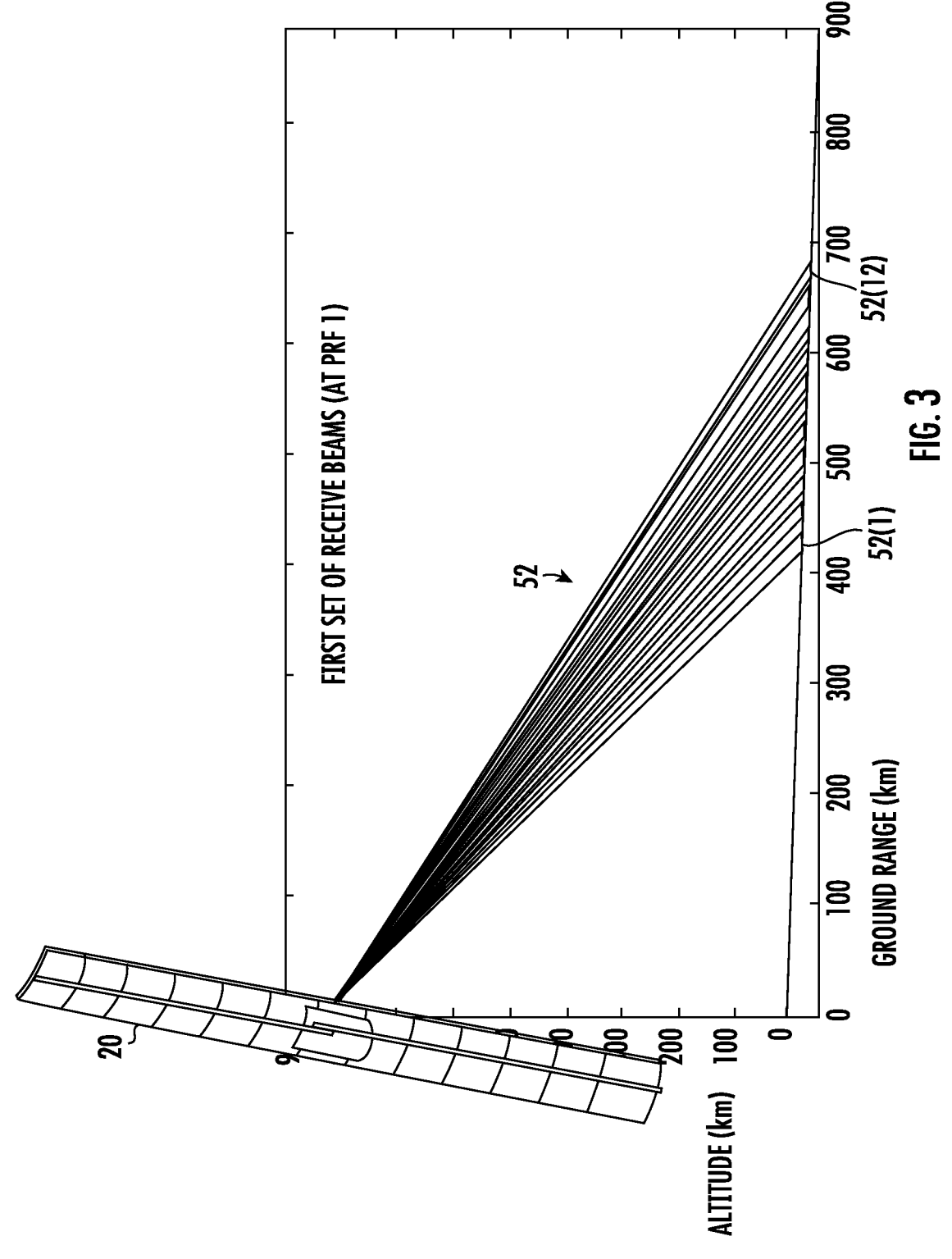
FIG. 3 is a schematic diagram of the elongate phased array antenna illustrated in FIG. 2 generating a first set of receive beams.

As noted above, the N channel inputs in the receiver 26 alternate between receiving the first set of N receive beams 52 and the second set of N receive beams 54. Referring now to FIG. 3, the elongate phased array antenna 22 generating the first set of N receive beams 52 at a first pulse repetition frequency (PRF) will be discussed.

The first set of N receive beams 52 form N first subswaths 52(1)-52(N). Based on the above example height of the elongate phased array antenna 22 being 17 meters, N is equal to 12. Consequently, 12 first subswaths 52(1)-52(12) are formed by the first set of 12 receive beams 52. Adjacent first subswaths are separated by a respective gap. Individual receive beams aimed at each first subswath 52(1)-52(12) differentiates them from one another. Each subswath in the first subswaths 52(1)-52(12) may cover about 11.5 km.

The transmitter 24 is configured to generate pulses to be received by the first set of 12 receive beams 52 at a first PRF. With the flight vehicle 10 configured as a satellite traveling about 800 km in altitude, for example, the first PRF corresponds to 66 pulses in round trip between the satellite and the first subswath 52(1).

That is, 66 pulses are transmitted before the first pulse is received by the receiver 26 for the first subswath 52(1) for the first set of 12 receive beams 52. Intervals of 66 pulses continue for the remaining first subswaths 52(2)-52(12). The first swath formed by the first subswaths 52(1)-52(12) is simultaneously measured for the first set of 12 receive beams 52.

Figure 4:
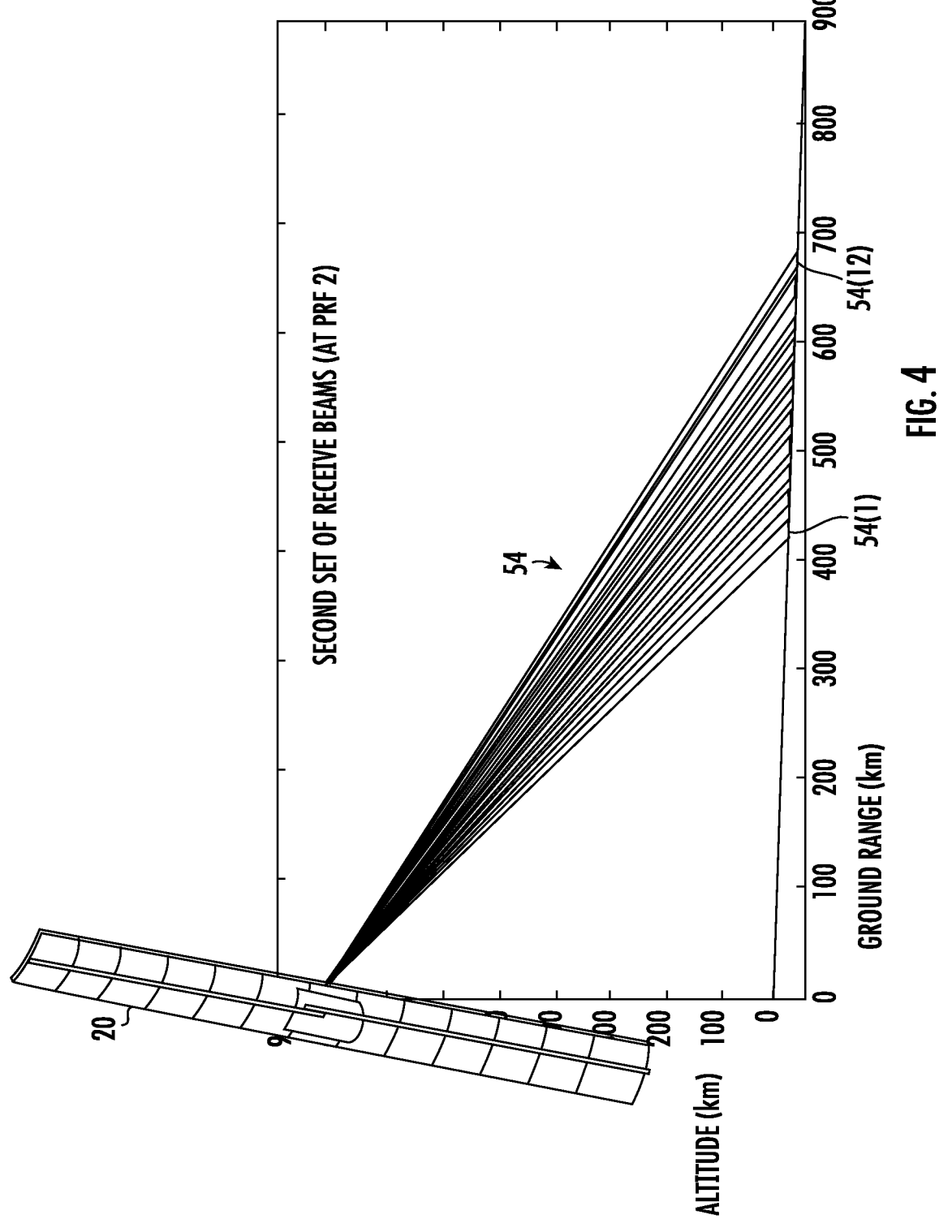
FIG. 4 is a schematic diagram of the elongate phased array antenna illustrated in FIG. 2 generating a second set of receive beams.

Referring now to FIG. 4, the elongate phased array antenna 22 generating the second set of N receive beams 54 at a second PRF will be discussed, where N is equal to 12. The second set of 12 receive beams 54 form 12 second subswaths 54(1)-54(12). Adjacent second subswaths are separated by a respective gap. Individual receive beams aimed at each second subswath 54(1)-54(12) differentiates them from one another. Each subswath in the second subswaths 54(1)-54(12) may cover about 11.5 km.

The transmitter 24 is configured to generate pulses to be received by the second set of 12 receive beams 54 at a second PRF that is slightly higher than the first PRF. The second PRF corresponds to 67 pulses in round trip between the satellite and the second subswath 54(1). The higher PRF causes the respective gaps in the second set of 12 receive beams 54 to be shifted to overlap the first subswaths 52(1)-54(12) in the first set of 12 receive beams 52.

That is, 67 pulses are transmitted before the first pulse is received by the receiver 26 for the second subswath 54(1). The 67 pulses continue for the remaining second subswaths 54(2)-54(12). The second swath formed by the second subswaths 54(1)-54(12) is simultaneously measured for the second set of 12 receive beams 54.

Figure 5:
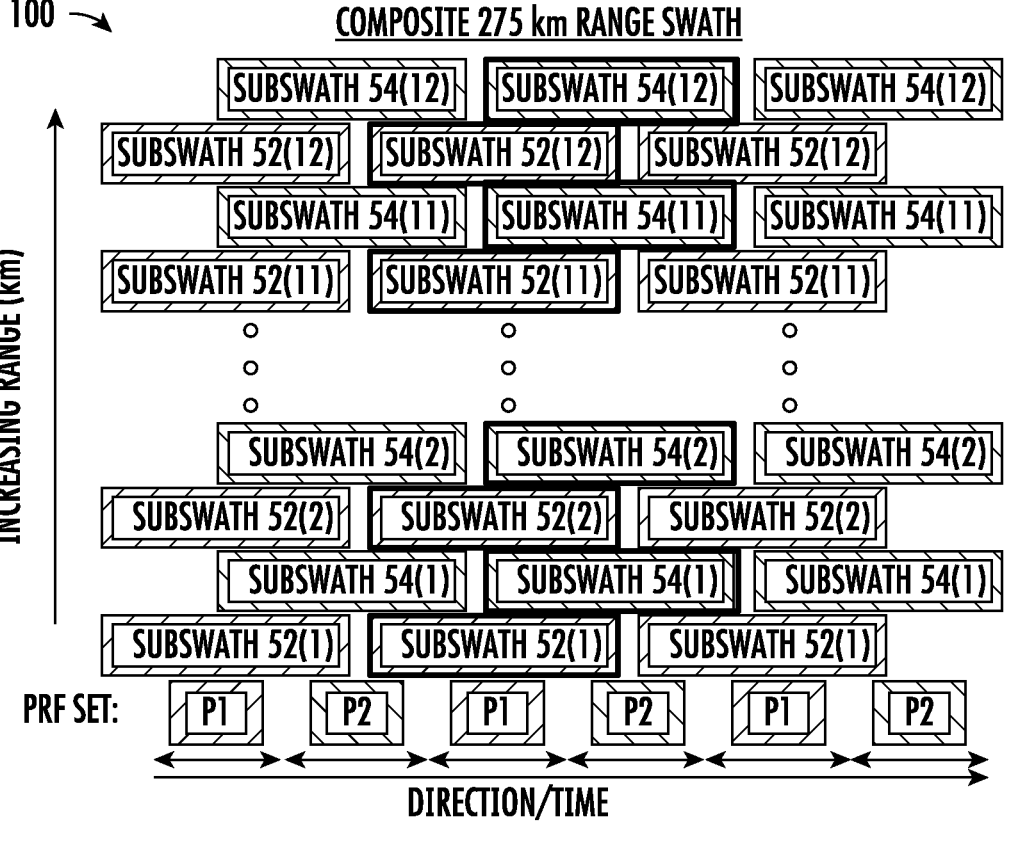
FIG. 5 is a plot of subswath coverage in terms of range and time for the first and second sets of receive beams as illustrated in FIGS. 3 and 4.

Referring not to FIG. 5, a plot 100 of subswath coverage for the first and second sets of receive beams 52, 54 in terms of range and time will be discussed.

The first set of receive beams 52 correspond to first subswaths 52(1)-52(12), and the second set of receive beams 54 correspond to second subswaths 54(1)-54(12). A total composite swath coverage of the SAR image being formed across the surface 50 below the flight vehicle 10 is about 275 km, for example, since each respective subswath may cover about 11.5 km.

The vertical axis represents an increasing range of the synthetic aperture radar 20. The horizontal axis represents direction/time of the synthetic aperture radar 20 with respect to alternating PRF pairs P1, P2. PRF P1 corresponds to the first subswaths 52(1)-52(12), and PRF P2 corresponds to the second subswaths 54(1)-54(12). The total composite swath coverage is shown for 3 sets of the PRF pairs P1, P2.

For the first set of PRF pairs P1, P2, the 12 first subswaths 52(1)-52(12) are simultaneously collected for PRF P1. Then the 12 second subswaths 54(1)-54(12) are simultaneously collected for PRF P2. This is repeated for the other sets of PRF pairs P1, P2.

Each simultaneously collected set of subswaths is centered in the along-track direction of the synthetic aperture radar 20 on the center of the flight path being flown by the flight vehicle 10 during the sets of PRF pairs P1, P2. The subswaths are over twice as long as the corresponding flight segment to ensure some overlap in the along-track direction with the next set collected at the same PRF.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

The invention claimed is:

1. A synthetic aperture radar (SAR) for a flight vehicle, the SAR comprising: an elongate phased array antenna oriented with a long axis in an elevation direction, the elevation direction being normal to a direction of flight of the flight vehicle, the elongate phased array antenna comprising a plurality of steerable elements forming a one-dimensional array along the long axis; a transmitter coupled to the elongate phased array antenna; a receiver coupled to the elongate phased array antenna; and a controller configured to cooperate with the transmitter and receiver to generate temporally alternating sets of receive beams for respective first and second swaths to be used to form a SAR image across a surface below the flight vehicle, the alternating sets of receive beams comprising a first set of receive beams for the first swath and comprising a plurality of first subswaths, with adjacent first subswaths being separated by a respective first gap, and a second set of receive beams for the second swath and comprising a plurality of second subswaths, with adjacent second subswaths being separated by a respective second gap, wherein the plurality of second subswaths overlap with the respective first gaps in the plurality of first subswaths.

2. The SAR according to claim 1 wherein the controller is configured to operate the receiver to receive the first set of receive beams before receiving the second set of receive beams.

3. The SAR according to claim 1 wherein the controller is configured to operate the transmitter to: generate pulses at a first pulse repetition frequency (PRF) to be received by the first set of receive beams; and generate pulses at a second PRF to be received by the second set of receive beams; the second PRF being higher than the first PRF to shift the respective second gaps in the second set of receive-3-beams to overlap the plurality of first subswaths in the first set of receive beams.

4. The SAR according to claim 1 wherein the controller is configured to operate the transmitter to transmit during the respective first and second gaps in the first and second sets of receive beams.

5. The SAR according to claim 1 wherein the elongate phased array antenna comprises M adjustable elements positioned along the long axis, the receiver comprises N channel inputs, the first and second set of receive beams each comprise N beams, and the plurality of first and second subswaths each comprise N subswaths, the SAR further comprising: a beam forming network (BFN) comprising M inputs coupled to the M adjustable elements in the elongate phased array antenna and N outputs coupled to the N channel inputs in the receiver, and configured to adjust the M adjustable elements for forming the N receive beams in the first and second swaths, with each channel input in the receiver corresponding to a respective subswath in the first set of receive beams and to a respective subswath in the second set of receive beams.

6. The SAR according to claim 5 further comprising a distribution network comprising M outputs coupled to the M adjustable elements in the elongate phased array antenna and an input coupled to an output of the transmitter, and configured to spread out the single beam by adjusting the M adjustable elements.

7. The SAR according to claim 1 wherein the transmitter is configured to operate at a fixed center frequency.

8. The SAR according to claim 1 wherein the elongate phased array antenna has a short axis oriented in an azimuth direction, and is configured to transmit a single beam across the respective swaths in the same azimuth direction.

9. The SAR according to claim 1 wherein the elongate phased array antenna comprises a reflector oriented with a long axis in the elevation direction opposite the plurality of steerable elements.

10. The SAR according to claim 1 wherein the controller is configured to transmit data to a remote image processor to form the SAR image across the surface below the flight vehicle.

11. A synthetic aperture radar (SAR) for a flight vehicle, the SAR comprising: an elongate phased array antenna oriented with a long axis in an elevation direction, the elevation direction being normal to a direction of flight of the flight vehicle, the elongate phased array antenna comprising a plurality of steerable elements forming a one-dimensional array along the long axis; a transmitter coupled to the elongate phased array antenna; a receiver coupled to the elongate phased array antenna; and a controller coupled to the transmitter and receiver and configured to generate a first set of receive beams for a first swath and comprising a plurality of first subswaths, with adjacent first subswaths being separated by a respective first gap; generate a second set of receive beams for a second swath and comprising a plurality of second subswaths, with adjacent second subswaths being separated by a respective second gap, and with the plurality of second subswaths overlapping with the respective first gaps in the plurality of first subswaths; the first and second set of receive beams to be used to form a SAR image across a surface below the flight vehicle; and operate the transmitter to transmit during the respective first and second gaps in the first and second sets of receive beams.

12. The SAR according to claim 11 wherein the controller is configured to operate the receiver to receive the first set of receive beams before receiving the second set of receive beams.

13. The SAR according to claim 11 wherein the controller is configured to operate the transmitter to generate pulses at a first pulse repetition frequency (PRF) to be received by the first set of receive beams; and generate pulses at a second PRF to be received by the second set of receive beams; the second PRF being higher than the first PRF to shift the respective second gaps in the second set of receive beams to overlap the plurality of first subswaths in the first set of receive beams.

14. The SAR according to claim 11 wherein the transmitter is configured to operate at a fixed center frequency.

15. The SAR according to claim 11 wherein the elongate phased array antenna has a short axis oriented in an azimuth direction, and is configured to transmit a single beam across the respective swaths in the same azimuth direction.

16. The SAR according to claim 11 wherein the elongate phased array antenna comprises a reflector oriented with a long axis in the elevation direction opposite the plurality of steerable elements.

17. A method for operating a synthetic aperture radar (SAR) for a flight vehicle, the SAR comprising an elongate phased array antenna oriented with a long axis in an elevation direction, the elevation direction being normal to a direction of flight of the flight vehicle, the elongate phased array antenna comprising a plurality of steerable elements forming a one-dimensional array along the long axis, a transmitter coupled to the elongate phased array antenna, and a receiver coupled to the elongate phased array antenna, the method comprising: operating a controller coupled to the transmitter and receiver to generate temporally alternating sets of receive beams for respective first and second swaths to be used to form a SAR image across a surface below the flight vehicle, the alternating sets of receive beams comprising a first set of receive beams for the first swath and comprising a plurality of first subswaths, with adjacent first subswaths being separated by a respective first gap, and a second set of receive beams for the second swath and comprising a plurality of second subswaths, with adjacent second subswaths being separated by a respective second gap, wherein the plurality of second subswaths overlap with the respective first gaps in the plurality of first subswaths.

18. The method according to claim 17 wherein the controller is configured to operate the receiver to receive the first set of receive beams before receiving the second set of receive beams.

19. The method according to claim 17 wherein the controller is configured to operate the transmitter to: generate pulses at a first pulse repetition frequency (PRF) to be received by the first set of receive beams; and generate pulses at a second PRF to be received by the second set of receive beams; the second PRF being higher than the first PRF to shift the respective second gaps in the second set of receive beams to overlap the plurality of first subswaths in the first set of receive beams.

20. The method according to claim 17 wherein the controller is configured to operate the transmitter to transmit during the respective first and second gaps in the first and second sets of receive beams.

21. The method according to claim 17 wherein the transmitter is configured to operate at a fixed center frequency.

* * * * *